(12) United States Patent
Shambaugh et al.

(10) Patent No.: US 6,804,668 B1
(45) Date of Patent: Oct. 12, 2004

(54) NATURAL LANGUAGE AGENT FOR MONITORING A THREADED DISCUSSION

(75) Inventors: Craig R. Shambaugh, Wheaton, IL (US); Anthony Dezonno, Bloomingdale, IL (US); Mark J. Power, Carol Stream, IL (US); Kenneth Venner, Winfield, IL (US); Jared Bluestein, Plymouth, NH (US); Jim F. Martin, Woodside, CA (US); Darryl Hymel, Batavia, IL (US); Laird C. Williams, St. Charles, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 195 days.

(21) Appl. No.: 09/669,983

(22) Filed: Sep. 26, 2000

(51) Int. Cl.[7] .......................... G06F 17/30; G06F 7/00; G06F 12/00
(52) U.S. Cl. .............................. 707/6; 707/10; 707/203
(58) Field of Search .............................. 707/6, 10, 203

(56) References Cited

U.S. PATENT DOCUMENTS 6,029,195 A * 2/2000 Herz ........................... 709/219
6,167,395 A * 12/2000 Beck et al. ..................... 707/3
6,192,354 B1 * 2/2001 Bigus et al. .................. 706/46

* cited by examiner

Primary Examiner—Wayne Amsbury
Assistant Examiner—Cindy Nguyen
(74) Attorney, Agent, or Firm—Welsh & Katz, Ltd.

(57) ABSTRACT

A method and apparatus are provided for identifying textual information for use in a threaded discussion. The method includes the steps of detecting key words and key words in context of the threaded discussion and weighting the detected words based upon an information content and context of each word and upon a time period since each word was last used to produce a weighted information content of the threaded discussion. The method further includes the steps of searching for and locating textual information within a database with an information content related to the weighted information content, comparing the information content of the located textual information with the weighted information content to provide an objective difference value and presenting the located textual information to the discussion where the objective difference value exceeds a threshold value.

31 Claims, 1 Drawing Sheet

NATURAL LANGUAGE AGENT FOR MONITORING A THREADED DISCUSSION

FIELD OF THE INVENTION

The field of the invention relates to the exchange of information and more particularly to the use of databases for the dissemination of information.

BACKGROUND OF THE INVENTION

The use of the Internet as a means for exchanging information is well known. Typically a user logs into chat room and enters text. Typically, the information is posted on an electronic bulletin board, which may be viewed by any other person logged into the chat room. As each person posts his views, any other person may comment on those views.

Occasionally, a person may post prepared text intended to inform or influence a reader. Usually, the prepared text is posted as a complete work.

In response, other participants to offer opinions or counter-arguments. A first respondant may raise additional points for or against the posted work. A second person may raise additional points for or against any previous person. As each additional participant enters the fray, the subject matter may diverge significantly from the originally posted work. Further, the subject matter of the discussion may change so quickly that few participants have time to think through the implications of posted comments. Because of the importance of the free exchange of information, a need exists for a means of grounding interactive conversations on factual basis.

SUMMARY

A method and apparatus are provided for identifying textual information for use in a threaded discussion. The method includes the steps of detecting key words and key words in context of the threaded discussion and weighting the detected words based upon an information content and context of each word and upon a time period since each word was last used to produce a weighted information content of the threaded discussion. The method further includes the steps of searching for and locating textual information within a database with an information content related to the weighted information content, comparing the information content of the located textual information with the weighted information content to provide an objective difference value and presenting the located textual information to the discussion where the objective difference value exceeds a threshold value.

DETAILED DESCRIPTION OF A PREFERRED EMBODIMENT

Figure 1:
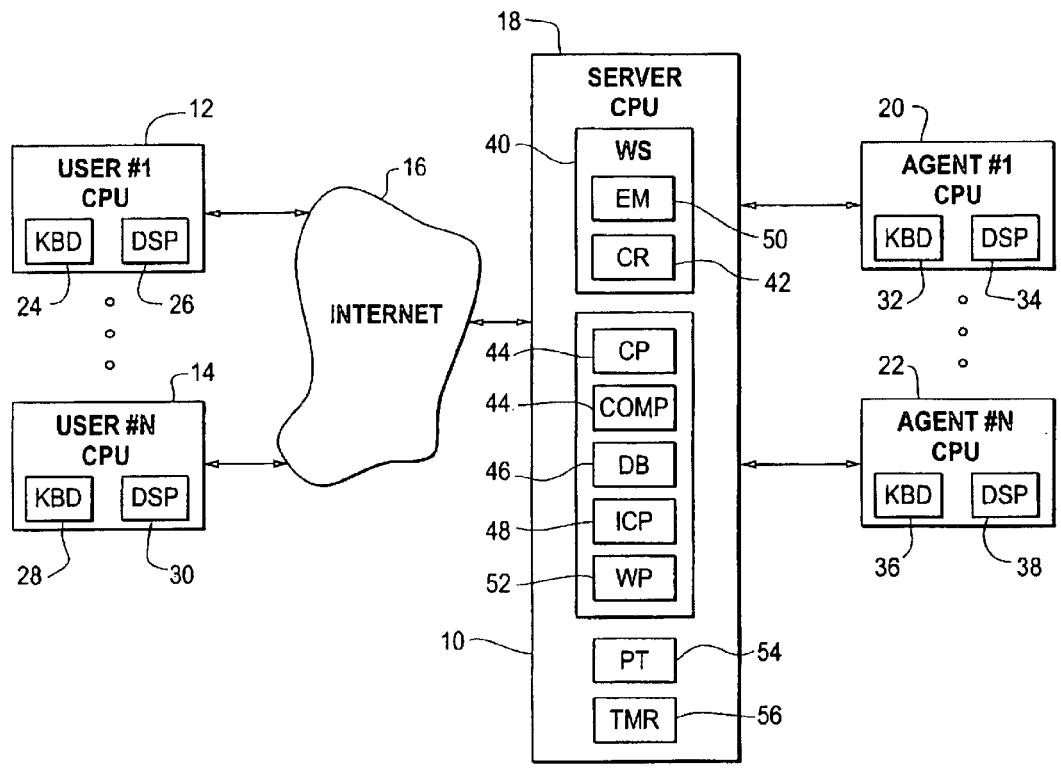
FIG. 1 is a block diagram of the natural language agent in accordance with an illustrated embodiment of the invention.

FIG. 1 is a block diagram of a natural language virtual agent 10 shown generally in a context of use. The virtual agent 10 may be used for monitoring and contributing to threaded discussions in accordance with an illustrated embodiment of the invention. Under the illustrated embodiment, the agent 10 monitors a threaded discussion, such as a news group, discussion group or on-line chat session. Using natural language processing and a case base or knowledge base methodology, the agent parses the information stream looking for questions which it is capable of answering with a high reliability. Those questions which it is capable of answering, it does by posting the information to the discussion. Those questions which it cannot answer to a sufficient degree of reliability, it may post to a human agent for confirmation and subsequent presentation, or rejection.

The agent 10 may have great utility in any of a number of situations, over and above, those suggested above. For example, by providing the factual underpinnings to any particular conversation, the agent 10 has the ability to guide a conversation to a desired result, whether the desired result is simply facilitating an informed populace, selling a product or advocating a particular political or environmental position. Further, in selling a product or advocating a particular political or environmental position, the agent 10 does not have to be in possession of a balanced set of facts.

Under the illustrated embodiment, two or more users 12, 14 may be engaged in a conversation. The conversation may be supported under any of a number of different formats. For example, a server 18 may provide a website 40 with a chat room 42. Alternatively, the server 18 may provide an e-mail system 50 for use by a predefined news or discussion group wherein e-mails addressed to the group 12, 14 in general are distributed to each member of the group 12, 14.

Under the illustrated embodiment, the agent 10 may receive and process text from each member of the conversation within a content processor 44. It should be understood that the agent 10 may simultaneously handle any number of threaded conversations.

The content processor 44 of the agent 10 may perform natural language processing in order to read through and parse text blocks or conversations to determine what questions are being asked and, once a question has been identified, to pass the question to an information content processor 48 to get a response.

For example, the threaded conversation may be related to the economy and factors that could affect the direction of the economy. One party 12, 14 may make the statement "How much is the federal deficit"?

The content processor 44 may parse the content of the conversation for key words and/or key words in context. Any appropriate software may be used (e.g., Brightwares natural languages processing, NetPerceptions grouping/ affinity alignment tools, etc.).

The words "How much" may be determined to be indicative of a question and a measure of the information desired. The word "deficit" may be identified as a key word indicating a subject of the question. The word "federal" may be found to be a key word in context, identifying the type of deficit involved.

Keywords may be weighted within a weighting processor 52 according to a time since they were last used to form a weighted information content, which reflects the threaded nature of the conversation. Keywords used more recently may be given a higher weight than older keywords. Keywords may also be weighted based upon a relative information content of each key word.

Weighting based upon time-of-use may be linear or based upon some other mathematical operator,(e.g., asymptotic, hyperbolic, etc.). As used herein, the term "threaded conversation" or "threaded discussion" means an information exchange between members of a group of at least two people where a progressive (i.e., weighted) information content of the discussion at any instant of time is determined by a temporal relation of the comments submitted by the participants to the conversation and wherein the most recent comments carry the most weight.

Upon receiving each response, the content processor 44 determines a weighted information content for the conversation carried forward to that instant. The content processor 44 passes the weighted information content to the information content processor 48. The information content processor 48 proceeds to search a database 46 for similar material.

The search may be performed under any of a number of different formats. The information content processor may search for key words throughout the database or the weighted information content may be used to define a subject matter which may then be used to limit the database search.

In the example given above, information about an actual or projected federal deficit may be searched for and located. The search may continue until a value of a most recent deficit is located.

Once similar materials have been located, the information content processor 48 may then endeavor to form an objective measure of the information content of the located material. The objective measure of information content may be based upon any appropriate gauge. For example, each of the key words identified within the threaded conversation and found within the located material may be weighted (i.e., using the corresponding weights of the weighted information content). The weights associated with each key word may then be summed. Key words not found within the located material would not be included within the sum (i.e., the missing key words would be given a value of zero), thereby providing a measure of the differences in information content.

Similarly, the weight values given to the key words of the weighted information content may be summed. A objective difference value may be determined by subtracting the sum of the weighted key words of the located material from the sum of the weighted key words of the conversation.

Alternatively, a Hamming distance may be determined between the words of the located material and the key words of the conversation. Identical words found within the located material may be given the highest value; synonyms a somewhat lesser value, related words a lesser value yet. Missing words may be given a value of zero. As above, the Hamming distance values assigned to each word of the located material may be multiplied by a corresponding weighting value and summed. As above, an objective difference value may be found by subtracting the summed weighted Hamming distance values of the located information from the sum of the weights of the weighted information content.

Figure 2:
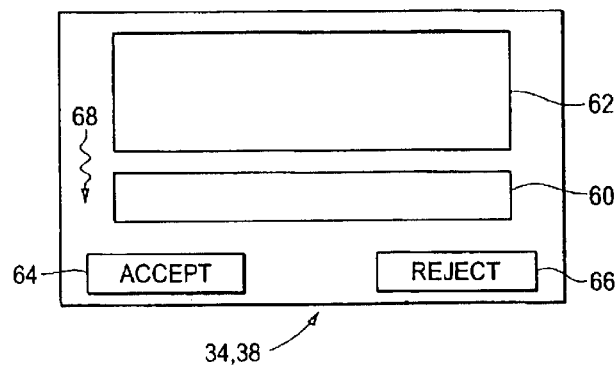
FIG. 2 depicts screens that may be viewed by a human agent of the natural language agent of FIG. 1.

Once an objective difference value has been determined, the difference value may be compared with a threshold within a comparator 44 to determine a measure of reliability. Where the objective difference value exceeds the threshold value, the located material may be presented to the conversation. Presentation of located textual information to a discussion means transferring the located textual information to a medium available to each member of the discussion group (e.g., by posting to the chat room, by e-mail, etc.).

Where the objective difference value does not exceed the threshold value, the located information may be transferred to a display 34, 38 of an agent 20, 22 along with a set of most recent contributions to the conversation. A first window 60 (FIG. 2) may be provided for located information. A second window 62 may be provided for the most recent portion of the conversation. The agent 20, 22 may review the located information and accept the located information as relevant, or reject the located information as not relevant. The agent 20, 22 may also reject the located information as being duplicative of materials already presented to the conversation.

Where the agent 20, 22 determines that the located material is relevant, he/she may place a cursor 68 over an ACCEPT softkey 64 and activate a switch (not shown) on the cursor 68. Where the agent 20, 22 determines that the located material is not relevant (or is duplicative), the agent 20, 22 may place the cursor 68 over a REJECT softkey 66 and reject the information.

Alternatively, the located information may be presented (or not presented) without human intervention. Where the objective difference value of the located information exceeds the threshold, the information is presented to the conversation. Where the objective difference value does not exceed the threshold, the located information may be simply discarded. Where information is discarded, the processor simply continues to follow the thread of the conversation until it finds information that can be presented to the conversation.

Under another embodiment of the invention, the server 18 may provide a repeating body of prepared text (e.g., news headlines, political or environmental positions, etc.) from a prepared text file 54. After the presentation of each paragraph from the prepared text file 54, the server 18 may wait a predetermined time (determined by a timer 56) for a response. If no response is received, the next paragraph is presented to members of the group 12, 14.

Where a response is received, the agent 10 processes the response in the context of the most recently presented prepared text to determine a weighted information content. Upon determining a weighted information content, the agent 10 searches for and locates relevant information in the database 46. The agent 10 compares a content of the located text with the weighted information content and determines an objective difference. As above, where the difference is less than a threshold value the agent 10 presents the text to the group 12, 14. If not, then the located text is presented to a human agent 20, 22 for evaluation.

If another response is received, the agent 10 responds accordingly. If not, the server 18 may return to the prepared text.

Alternatively, the agent 10 may prepare a weighted information content (including its own response) and search the prepared text for a new entry point. A difference value may be determined and, if less than the threshold, presentation may be resumed at the new entry point.

As demonstrated above, the threaded conversation may be free-flowing or directed to some objective. A free-flowing conversation may be achieved by an unbiased database and high threshold values.

Alternatively, a directed conversation may be achieved with somewhat lower thresholds and a database having a content directed to some objective. The threaded conversation may be further controlled by reducing a time period allowed for response by the conversation's participants 12, 14. By reducing the time period for response, the agent 10 inherently weights the threaded conversation based upon its own agenda.

A specific embodiment of a method and apparatus for a natural language agent for monitoring a threaded conversation according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of identifying textual information for use by an organization in a threaded discussion to guide the discussion towards a result desired by the organization, such method comprising the steps of:

detecting key words and key words in context of the threaded discussion;

weighting the detected words based upon an information content and context of each word and upon a time period since each word was last used to produce a weighted information content of the threaded discussion;

searching for and locating textual information within a database with an information content related to the weighted information content wherein the located textual information further comprises information that guides the discussion towards the result desired by the organization;

comparing the information content of the located textual information with the weighted information content to provide an objective difference value; and presenting the located textual information to the discussion where the objective difference value exceeds a threshold value and wherein the presented textual information is based only upon the desired result advocated by the organization and not upon an objective of a participant to the threaded discussion.

2. The method of identifying textual information as in claim 1 further comprising presenting the located textual information to a human agent for approval where the objective difference value does not exceed the threshold value.

3. The method of identifying textual information as in claim 2 wherein the step of presenting the located textual information to a human agent for approval further comprises presenting an immediately previous portion of the threaded discussion to the agent along with the located information.

4. The method of identifying textual information as in claim 3 further comprising rejecting the located textual information by the human agent for presentation to the threaded discussion when the located information is substantially identical to the immediately previous portion of the threaded discussion.

5. The method of identifying textual information as in claim 2 wherein the step of presenting the located textual information to the agent further comprises presenting the located textual information to the discussion where the located textual information is approved by the human agent.

6. The method of identifying textual information as in claim 1 wherein the step of presenting the located textual information further comprises waiting a predetermined time period for a response from other parties to the threaded discussion.

7. The method of identifying textual information as in claim 1 further comprising detecting key words and key words in context within the located textual information to locate additional textual information for presentation to the threaded discussion when a response is not detected within the predetermined time period.

8. The method of identifying textual information as in claim 6 further comprising presenting additional textual information following a predetermined thread from the located textual information when a response is not detected within the predetermined time period.

9. The method of identifying textual information as in claim 1 further comprising initiating the threaded discussion by presenting an initial paragraph of textual information.

10. The method of identifying textual information as in claim 9 further comprising following the predetermined threaded presentation until receiving a response from other parties to the threaded discussion.

11. An apparatus for of identifying textual information for use by an organization in a threaded discussion to guide the discussion towards a result desired by the organization, such apparatus comprising:

means for detecting key words and key words in context of the threaded discussion;

means for weighting the detected words based upon an information content and context of each word and upon a time period since each word was last used to produce a weighted information content of the threaded discussion;

means for searching for and locating textual information within a database with an information content related to the weighted information content that guides the threaded discussion towards the result desired by the organization;

means for comparing the information content of the located textual information with the weighted information content to provide an objective difference value; and means for presenting the located textual information to the discussion where the objective difference value exceeds a threshold value and wherein the presented textual information is based only upon the desired result advocated by the organization and not upon an objective of a participant to the threaded discussion.

12. The apparatus for identifying textual information as in claim 11 further comprising means for presenting the located textual information to a human agent for approval where the objective difference value does not exceed the threshold value.

13. The apparatus for identifying textual information as in claim 12 wherein the means for presenting the located textual information to a human agent for approval further comprises means for presenting an immediately previous portion of the threaded discussion to the agent along with the located information.

14. The apparatus for identifying textual information as in claim 13 further comprising means for rejecting the located textual information by the human agent for presentation to the threaded discussion when the located information is substantially identical to the immediately previous portion of the threaded discussion.

15. The apparatus for identifying textual information as in claim 12 wherein the means for presenting the located textual information to the agent further comprises means for presenting the located textual information to the discussion where the located textual information is approved by the human agent.

16. The apparatus for identifying textual information as in claim 11 wherein the means for presenting the located textual information further comprises means for waiting a predetermined time period for a response from other parties to the threaded discussion.

17. The apparatus for identifying textual information as in claim 11 further comprising means for detecting key words and key words in context within the located textual information to locate additional textual information for presentation to the threaded discussion when a response is not detected within the predetermined time period.

18. The apparatus for identifying textual information as in claim 16 further comprising means for presenting additional textual information following a predetermined thread from the located textual information when a response is not detected within the predetermined time period.

19. The apparatus for identifying textual information as in claim 11 further comprising means for initiating the threaded discussion by presenting an initial paragraph of textual information.

20. The apparatus for identifying textual information as in claim 19 further comprising means for following the predetermined threaded presentation until receiving a response from other parties to the threaded discussion.

21. An apparatus for of identifying textual information for use by an organization in a threaded discussion to guide the threaded discussion towards a result desired by the organization, such apparatus comprising:
- a content processor adapted to detect key words and key words in context of the threaded discussion;
- a weighting processor adapted to weight the detected words based upon an information content and context of each word and upon a time period since each word was last used to produce a weighted information content of the threaded discussion;
- an information content processor adapted to search for and locating e textual information within a database with an information content related to the weighted information content that preferentially guides the threaded discussion towards the result desired by the organization;
- a comparator adapted to compare the information content of the located textual information with the weighted information content to provide an objective difference value; and
- a server adapted to present the located textual information to the discussion where the objective difference value exceeds a threshold value and wherein the presented textual information is based only upon the desired result advocated by the organization and not upon an objective of a participant to the threaded discussion.

22. The apparatus for identifying textual information as in claim 21 further comprising a first window adapted to present the located textual information to a human agent for approval where the objective difference value does not exceed the threshold value.

23. The apparatus for identifying textual information as in claim 22 wherein the first window further comprises a second window adapted to present an immediately previous portion of the threaded discussion to the agent along with the located information.

24. The apparatus for identifying textual information as in claim 23 further comprising a reject softkey adapted to reject the located textual information by the human agent for presentation to the threaded discussion when the located information is substantially identical to the immediately previous portion of the threaded discussion.

25. The apparatus for identifying textual information as in claim 22 wherein the first window further comprises an accept softkey adapted to present the located textual information to the discussion where the located textual information is approved by the human agent.

26. The apparatus for identifying textual information as in claim 21 wherein the server further comprises a prepared text for presentation to other parties of the discussion.

27. The apparatus for identifying textual information as in claim 26 wherein the server further comprises a timer adapted to wait a predetermined time period for a response from other parties to the prepared text.

28. The apparatus for identifying textual information as in claim 27 comprising the content processor further adapted to detect key words and key words in context within the prepared text to locate a new entry point for presentation to the threaded discussion when a response is not detected within the predetermined time period.

29. The apparatus for identifying textual information as in claim 28 comprising the server further adapted to present additional prepared textual information following a predetermined thread from the located textual information when a response is not detected within the predetermined time period.

30. The apparatus for identifying textual information as in claim 21 further comprising the server further adapted to initiate the threaded discussion by presenting an initial paragraph of the prepared textual information.

31. The apparatus for identifying textual information as in claim 30 further comprising the server further adapted to follow the prepared text until receiving a response from other parties to the threaded discussion.

\* \* \* \* \*